July 20, 1948.  C. F. SPANG  2,445,589
SLICING MACHINE INCLUDING A STATIONARY CUTTING
GRID AND A RECIPROCATING PLUNGER
Filed Jan. 4, 1946   2 Sheets-Sheet 1

Inventor:
Carl F. Spang,
by Kenway & Witter
Attorneys

July 20, 1948.  C. F. SPANG  2,445,589
SLICING MACHINE INCLUDING A STATIONARY CUTTING
GRID AND A RECIPROCATING PLUNGER
Filed Jan. 4, 1946  2 Sheets-Sheet 2
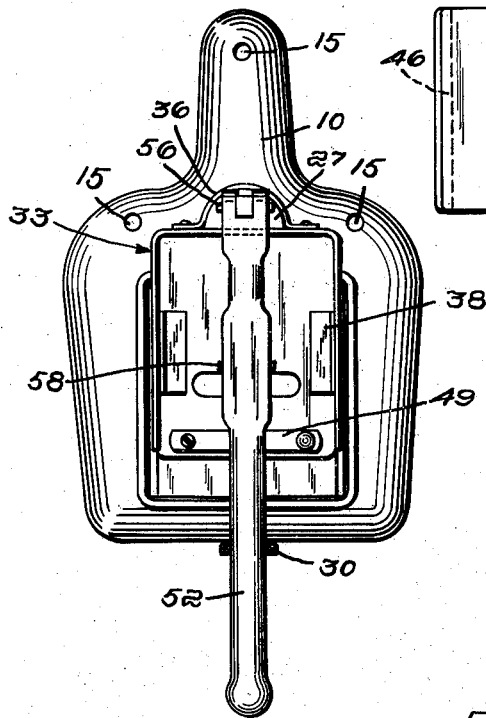
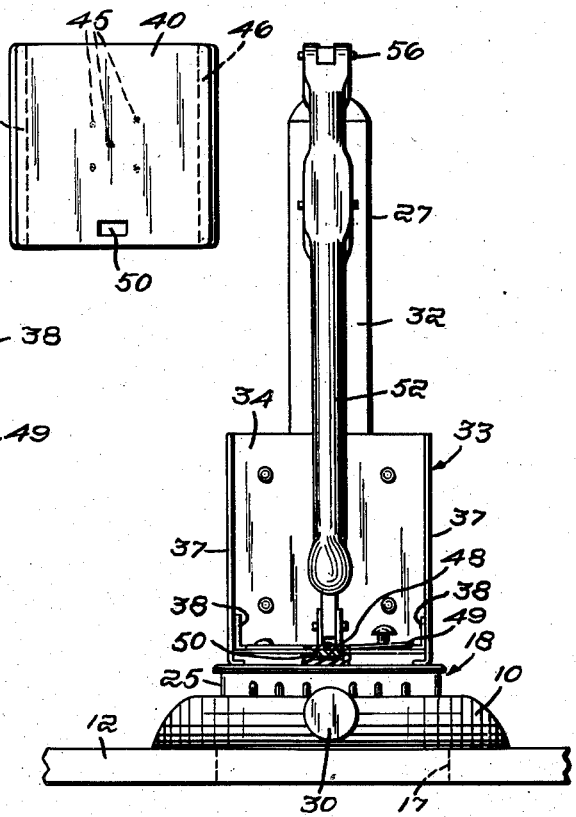
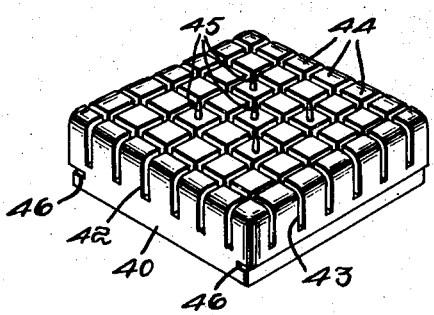
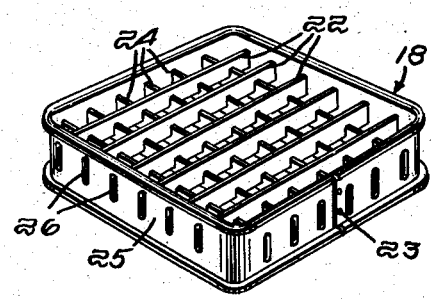
Inventor:
Carl F. Spang,
by Kenway & Witter
Attorneys Patented July 20, 1948

2,445,589

UNITED STATES PATENT OFFICE 2,445,589

SLICING MACHINE INCLUDING A STATIONARY CUTTING GRID AND A RECIPROCATING PLUNGER

Carl Francis Spang, Milton, Mass., assignor to Cube Steak Machine Co., Boston, Mass., a partnership Application January 4, 1946, Serial No. 639,079

1 Claim. (Cl. 146—169)

This invention relates to a machine for preparing foodstuffs and I have herein illustrated it in the form of a novel and convenient apparatus for slicing potatoes and other vegetables into strips for cooking. My improved apparatus as thus illustrated embodies a base adapted to be secured to a table and having a well or downwardly extending opening therethrough adapted to align with an opening through the table, together with prearranged slicing knives over the base opening and means for forcing vegetables and like food products downwardly across the knives and through the openings.

The slicing knives are constructed in the form of a conveniently removable member and the cooperating piston which contacts the food is preferably provided with holding spikes and is also removable, whereby permitting convenient interchanging of these food contacting parts and facilitating clean and sanitary conditions. The apparatus furthermore embodies a single supporting post on and extending upwardly from the base for supporting and guiding the carrier and is extremely simple and economical to manufacture.

In a broader aspect, the machine is adapted for use in preparing various foods, such as the forming of meat patties, juicing oranges, etc., when other parts suitable to such purposes are interchanged with the knives and piston. The production of an improved machine for performing these functions comprises the primary object of the invention.

Figure 1:
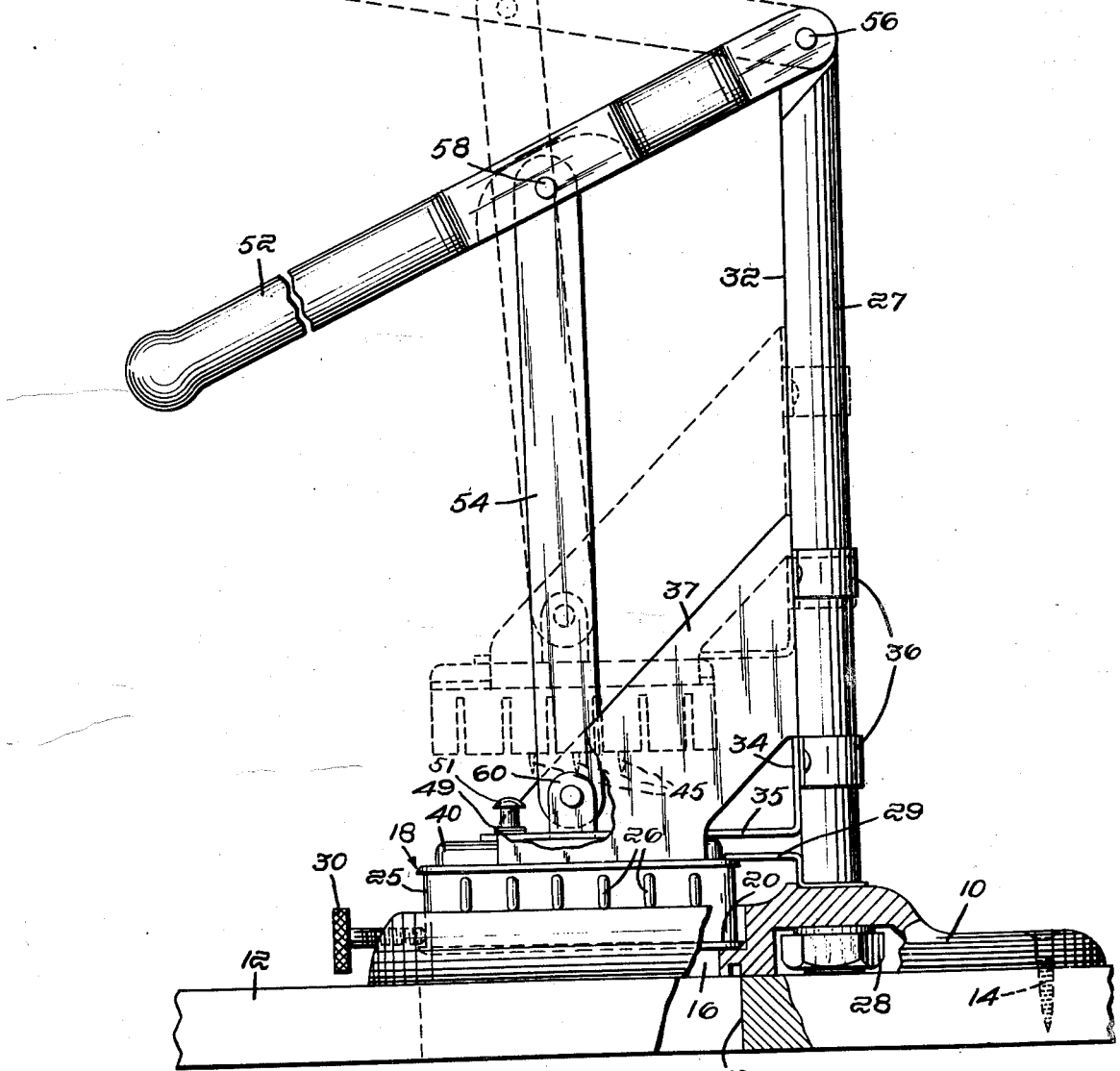
Figure 2:
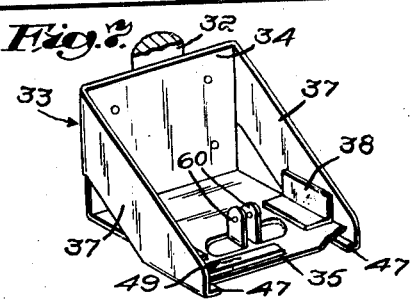

These and other features of the invention will be best understood and appreciated from the following description of a preferred embodiment thereof selected for purposes of illustration and shown in the accompanying drawings in which, Fig. 1 is a side elevation of my improved machine, Fig. 2 is a plan view, Fig. 3 is a front elevation, Fig. 4 is a plan view of the piston, Fig. 5 is a bottom perspective view of the piston, Fig. 6 is a perspective view of the slicing member, and Fig. 7 is a fragmentary perspective view of the carrier.

Referring to the drawings by reference characters, 10 indicates the base of my improved slicer which is adapted to rest on a table 12 and be secured thereto by screws 14 in base openings 15. The base has an opening 16 therethrough in alignment with an opening 17 in the table. A slicing member 18 is adapted to be disposed over the opening 16 and rest on a ledge 20. This member embodies two sets 22 and 24 of spaced and upwardly facing knives disposed transversely of each other and secured at their ends in a sheet metal rim 25. The rim is provided with outwardly depresser recesses 26 for receiving the ends of the knives and the ends of the rim are riveted or otherwise secured together at 23. A post 27 mounted vertically on the base rearwardly of the opening 16 is rigidly secured to the base by a nut 28. The slicing member 18 is removably held in the opening beneath a finger 29 carried by the post in cooperation with a binding screw 30 threaded to the base.

The post 27 is of rigid construction and, as illustrated, its formed facing portion presents a flat surface 32 in a vertical plane. A carrier 33 has a rear vertical portion 34 in surface sliding contact with the surface 32 and a forwardly extending horizontal portion 35 disposed over the opening 16. Metal straps 36 carried by the portion 34 and disposed about the post maintain the carrier in sliding contact with the post and in flat contact with the surface 32. In the carrier illustrated, a single sheet of metal is bent to form the vertical and horizontal portions 34 and 35 and side brackets 37, the side brackets being connected to the horizontal portion 35 by angle pieces 38 spot welded thereto.

The carrier 33 is adapted to carry a piston 40 disposed over and cooperating with the slicer 18. The piston is formed of fibre, wood or other suitable material and is slotted transversely in two directions at 42 and 43 to receive the knives and embodies downwardly extending projections 44 between the slots for entering the areas disposed between the knives. The piston is slotted at opposite sides 46 to provide guideways for receiving inwardly directed flanges 47 formed on the ends of the brackets 37. A detent 48 carried by a leaf spring 49 attached to the portion 35 of the carrier is adapted to enter a recess 50 in the piston for locating and securing the piston in working position in the carrier. A lifting knob 51 is provided on the free end of the spring.

The post 27 is adapted to guide the carrier and piston in their vertical movements and such movements are imparted by a handle 52 and link 54. The handle is pivoted to the top end of the post at 56 and projects forwardly over the base. The link has its top end pivoted to the handle at 58 and its bottom end is pivoted to two ears 60 struck out and bent up from the carrier portion 35. It will be apparent that the carrier is raised and lowered by pivotal movement of the handle and the engagement of the carrier with the plane surface 32 of the post together with the straps 36 serve to maintain the carrier and piston properly located over the slicing member 18. Potatoes and other vegetables to be sliced are placed on the slicing member and are forced past the knives by the piston, a pan being provided beneath the openings 16 and 17 for receiving the slices.

It is desirable that the food thus to be sliced shall remain in fixed position relative to the piston during the slicing operation and this function is performed by a plurality of pins or spikes 45 projecting downwardly from the piston 40. These pins penetrate the food and not only hold it from slipping from beneath the piston but also maintain it in such fixed position that it is accurately sliced into straight and uniform pieces.

While I have herein illustrated my proposed machine in the form of a slicer for vegetables and like foods, it will be readily apparent that by substituting other suitable parts for the slicing member 18 and the piston 40 the machine can be adapted to various uses. Examples of such uses comprise the compressing of ground meat or other like food masses into patties of predetermined shape, the juicing of citrus fruits, etc.

Having thus disclosed my invention what I claim as new and desire to secure by Letters Patent is:

A food slicer comprising a base adapted to be secured to a table and having a downwardly extending opening therethrough adapted to align with an opening through the table, a slicing member disposed on the base over the opening and embodying two sets of upwardly facing knives, each set comprising a plurality of spaced and parallel knives disposed transversely across the knives of the other set, a single post carried by and extending upwardly from the base rearwardly of its said opening and having a flat forwardly facing surface in a vertical plane, a carrier having a vertical portion in sliding contact with said surface and a forwardly extending horizontal portion over the base opening, said vertical and horizontal portions of the carrier embodying one integral sheet of metal, side brackets also integral with said sheet and connecting said vertical and horizontal portions, means securing the carrier to the post and maintaining said vertical portion in flat contact with said forwardly facing surface, a piston, means on the horizontal portion of the carrier for detachably connecting the piston therewith and in cooperative relation with the knives, an elongated handle member pivoted at one end to the upper end of the post, and a link pivoted to the handle member at one end and to the carrier at the other end to raise and lower the carrier and piston relative to the knives.

CARL FRANCIS SPANG.

REFERENCES CITED

The following references are of record in the file of this patent:

UNITED STATES PATENTS

| Number | Name | Date |
| --- | --- | --- |
| 608,363 | Lawson | Aug. 2, 1898 |
| 1,867,657 | Dellinger | July 19, 1932 |
| 1,947,153 | Dellinger | Feb. 13, 1934 |
| 2,293,345 | Kulp et al. | Aug. 18, 1942 |

FOREIGN PATENTS

| Number | Country | Date |
| --- | --- | --- |
| 239,979 | Great Britain | Sept. 24, 1925 |